Oct. 14, 1924.  
J. F. LINDLEY  
1,511,287  
MACHINE FOR MAKING CHILI SAUCE  
Filed March 11, 1922  
3 Sheets-Sheet 1
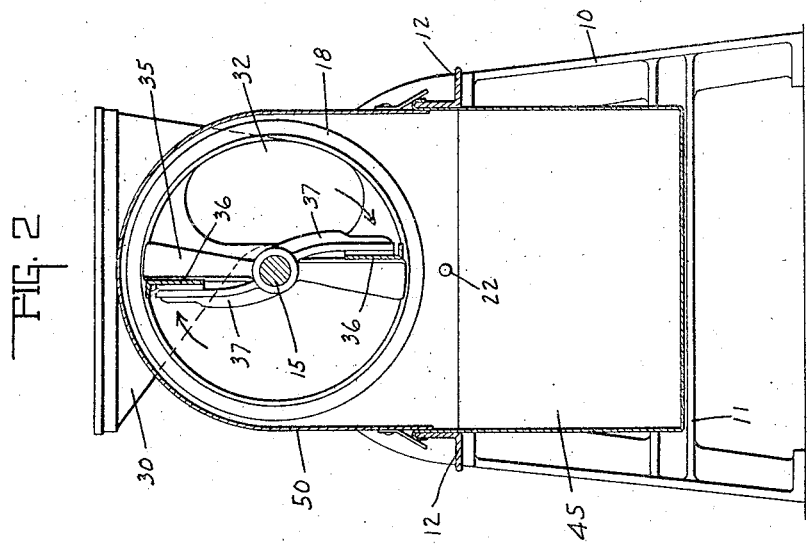
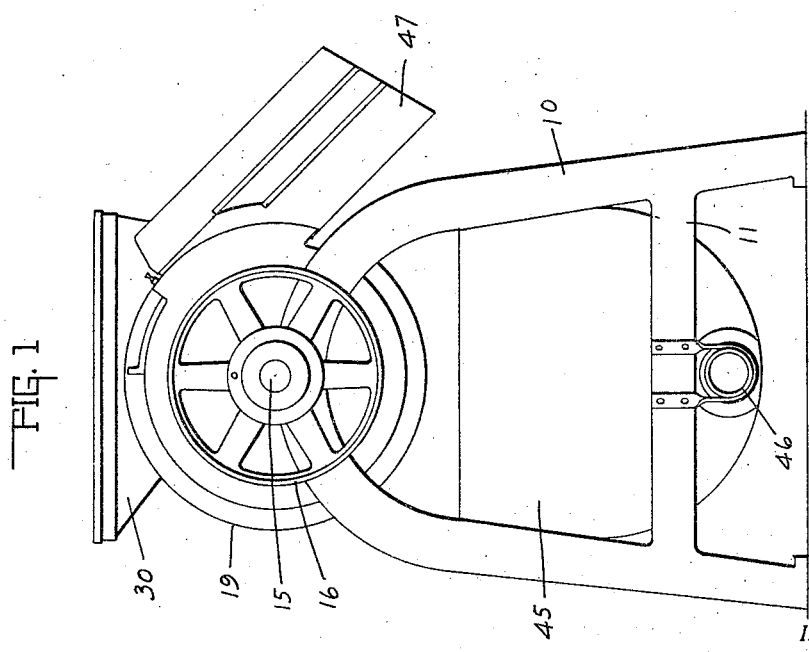
INVENTOR.  
JAMES F. LINDLEY.  
BY  
ATTORNEYS.

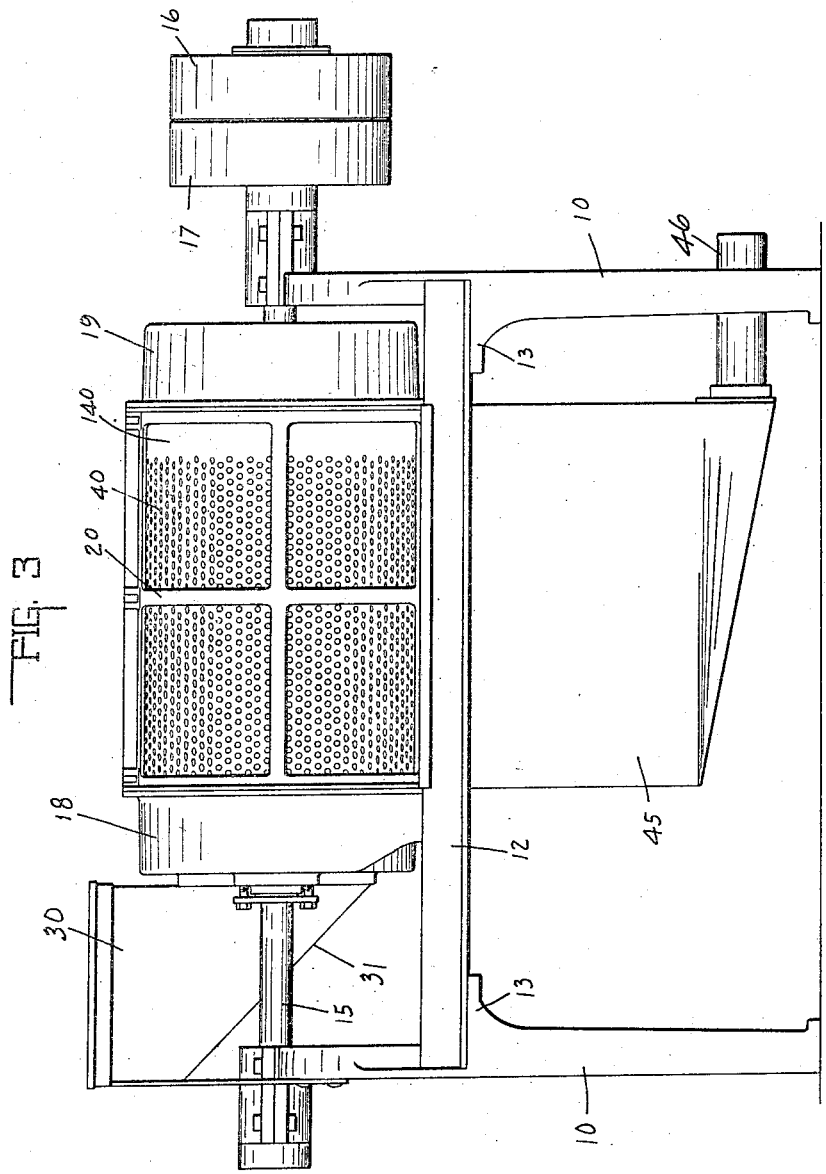

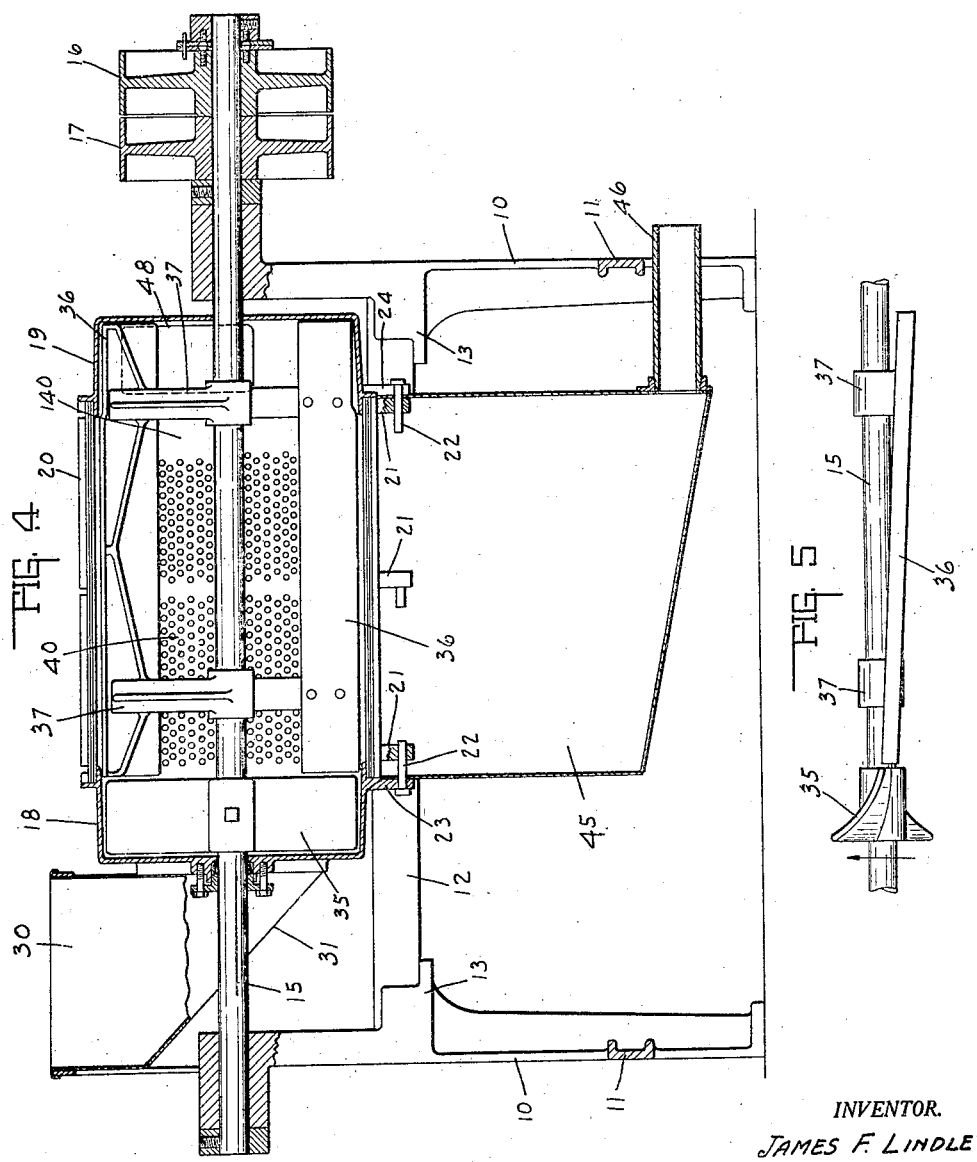

Patented Oct. 14, 1924.

1,511,287

UNITED STATES PATENT OFFICE.

JAMES F. LINDLEY, OF INDIANAPOLIS, INDIANA, ASSIGNOR TO INDIANA CANNING MACHINERY COMPANY, OF INDIANAPOLIS, INDIANA, A CORPORATION.

MACHINE FOR MAKING CHILI SAUCE.

Application filed March 11, 1922. Serial No. 542,938.

*To all whom it may concern:*

Be it known that I, JAMES F. LINDLEY, a citizen of the United States, and a resident of Indianapolis, county of Marion, and State of Indiana, have invented a certain new and useful Machine for Making Chili Sauce; and I do hereby declare that the following is a full, clear, and exact description thereof, reference being had to the accompanying drawings, in which like numerals refer to like parts.

The purpose of this machine is to make chili sauce, or treat tomatoes to make chili sauce material. Heretofore, so far as I am aware, no machine has ever been used or capable of use for making chili sauce; and for that reason the manufacture and sale of chili sauce has been limited. It has been made by hand, and, therefore, manufacturers have been unable to make enough chili sauce to supply the demand, because it is impossible to get enough peelers at the time when the tomatoes are ready and can be used.

The object of this invention is to provide a machine which will do the work of a very large number of women, and will simultaneously peel or remove the skins of the tomatoes, disintegrate the material suitable for chili sauce leaving in the seeds, separate the skins and cores from the meat and do it uniformly, and discharge them separately. In this manner one machine can treat many thousands of bushels of tomatoes per hour, so as to make it into chili sauce material; and with the use of such machines manufacturers can increase the output of chili sauce sufficient to meet the demand therefor.

The various features of the machine and invention which enable it to make chili sauce will be more fully understood from the accompanying drawings and the following description and claims.

In the drawings, Fig. 1 is an end elevation of the machine. Fig. 2 is a transverse section through the same about midway of the length of the machine. Fig. 3 is a side elevation of the machine with the cover removed from the cylinder to show the screen. Fig. 4 is a central vertical longitudinal section through the machine. Fig. 5 is a plan view of a paddle and an impeller and the shaft on which they are mounted.

The framework of the machine consists substantially of end frames 10 having cross bars 11 above the lower ends of the legs thereof, and side bars 12 secured below the tops of the end frame on the abutment or shoulders 13, as shown in Fig. 3.

In the upper part of the end frames, there is mounted a shaft 15 driven by a pulley 16 with an idler 17. The shaft extends centrally through a horizontal cylinder which is composed of the cylinder ends 18 and 19, see Fig. 4, and semi-cylindrical frames 20 which are pivoted at the bottom by ears 21 on pins 22 in the extensions 23 and 24 from the cylinder ends 18 and 19 respectively. The cylinder frames 20 come together at the top, where they are secured by a catch of some kind not shown, during the operation of the machine.

At one end of the cylinder frame, there is a hopper 30 into which the tomatoes are introduced to the machine. The under side 31 of the hopper slopes downwardly to the throat 32 of the cylinder. This throat is an opening in the cylinder end 18 located on one side of the shaft 15, as seen in Fig. 2, and the lower part of the hopper is likewise located on one side of said shaft, as shown.

Within the cylinder end 18, there is an impeller 35 secured to the shaft 15, as shown in Fig. 4, and the impeller in cross section is curved substantially as shown at the left hand end of Fig. 5, and it is rotated in the direction indicated by the arrow in Figs. 2 and 5, so that it will rapidly feed the tomatoes from the hopper into the cylinder of the machine and without materially breaking up the tomato. The cylinder of the machine is free from any obstruction between it and the impeller 35, so that the tomatoes are not broken up while entering the cylinder or beaten into a pulp.

The paddles 36 are secured by arms 37 on the shaft 15. The arms 37 are radial and the outer surface of the paddle is substantially equidistant from the shaft 15 at all points, but the paddle is inclined longitudinally with reference to the shaft 15, as shown in Fig. 5. The left hand end of the paddle is in alignment with the inner and rear edge of the impeller 35, as shown, and from the end adjacent the impeller the paddle is inclined away from a plane through the axis of the shaft 15. The rear end of the paddle is extended into the cylinder end 19, as shown in Fig. 4. The cylinder frame is provided with screens 40 which may be mounted therein in fixed position in any suitable way, but they have relatively large perforations in them, about four times as large as a tomato pulping machine and sufficient to permit the passage of the seeds through the perforations. The perforations in this machine are preferably about one-quarter of an inch in diameter, and the perforations do not extend for the full length of the cylinder, but there is left a blank portion 140 at the discharge end, so that the perforated portion in this machine is substantially two-thirds that of the pulping machine. The lead in the paddles is about one and one-half inches and the outer edges of the paddles are spaced away from the screens more than a quarter of an inch.

The peculiarities of this machine above enumerated are to facilitate the peeling of the tomatoes, the disintegration of the meat thereof, and the ultimate separation of the skins from the meat with the seeds. The meat is discharged in relatively large portions through the screen into a receptacle 45 located under the cylinder and having an inclined bottom leading to an outlet 46 for the chili sauce material. The skins are discharged through the spout see Fig. 1, which is secured to the cylinder end 19, which is provided with a discharge opening 48 therefor. The cores are also discharged with the skins.

In making chili sauce the meat must be in relatively large portions instead of being juice or pulp, and must be free from skins but retains the seeds. Consequently the machine must be so constructed and operated that it will separate the skins and cores and prevent, particularly the skins, from passing through the screen with the meat or chili sauce material. To accomplish this result the tomatoes are fed in at one side of the cylinder through a single opening and by a down stroke of the propeller and the impellers curved to rapidly move the tomatoes into the cylinder without crushing and pulping them, and hence the cylinder is free from any cores located between the impellers and the main body of the cylinder that would have such effect. The paddles are also in line with and adjacent to the impellers, so that the impellers will not throw the tomoto too far into the cylinder before it is engaged by the paddle. The paddles are spaced from the screens, so that they will quickly remove the skins from the tomato and will disintegrate the tomato by rubbing it against the screen into comparatively large lumps suitable for chili sause rather than pulp the same. A lead or inclined position of the paddles will speed the movement of the skins through the machine, so that they will not pass out through the screen, thus effectively separating the skins and cores from the chili sauce material that goes through the screens. A cover 50 envelops the top and sides of the cylinder, as shown in Fig. 2, while the machine is in operation. This leaves the bottom of the cylinder open for the chili sauce material to pass over perforations into the receptacle below.

The invention claimed is:

1. A chili sauce machine including a substantially horizontal cylinder with relatively large perforations therein sufficient to permit the meat in large lumps and the seeds to pass through the same, an inlet into one end of said cylinder located at one side of the center line of said cylinder, an impeller adapted to engage tomatoes in the inlet of the cylinder on its downward stroke and feed the same to the cylinder without materially disintegrating the same, revoluble paddles in said cylinder for rubbing the tomatoes against the cylinder and arranged to feed the skins rapidly through the cylinder in order to discharge the same at the end thereof, and a receptacle under the cylinder for receiving the chili sauce material.

2. A chili sauce machine including a substantially horizontal cylinder with relatively large perforations therein sufficient to permit the meat in large lumps and the seeds to pass through the same, a hopper at one end of the cylinder with the inlet therefrom into the cylinder located at one side of the center line thereof, a central shaft in said cylinder, an impeller on said shaft with a curved face arranged so as to rapidly feed the tomatoes into the cylinder, means for rotating said shaft in the direction which will give the impeller a down stroke on the tomatoes whereby they will not be materially disintegrated, paddles mounted on said shaft adapted to rub the tomatoes against the cylinder and arranged to feed the refuse rapidly through the cylinder, and a receptacle under the cylinder for receiving the chili sauce material.

3. A chili sauce machine including a substantially horizontal cylinder with relatively large perforations therein sufficient to permit the meat in large lumps and the seeds to pass through the same, a hopper at one end of the cylinder with the inlet therefrom into the cylinder located at one side of the center line thereof, a central shaft in said cylinder, an impeller on said shaft with a curved face arranged so as to rapidly feed the tomatoes into the cylinder, means for rotating said shaft in the direction which will give the impeller a down stroke on the tomatoes whereby they will not be materially dinintegrated, paddles mounted on said shaft and relatively far from the cylinder but in position to rub the tomatoes against the same and longitudinally inclined with reference to the axis of the shaft so as to facilitate the free movement of the refuse through the cylinder as and for the purpose set forth, and a receptacle under the cylinder for receiving the chili sauce material.

4. A chili sauce machine including a substantially horizontal cylinder with relatively large perforations therein sufficient to permit the meat in large lumps and the seeds to pass through the same, a hopper at one end of the cylinder with the inlet therefrom into the cylinder located at one side of the center line thereof, a central shaft in said cylinders, impellers on said shaft with curved faces curved so as to rapidly feed the tomatoes into the cylinder, means for rotating said shaft in the direction which will give the impellers a down stroke on the tomatoes whereby they will not be materially disintegrated, paddles mounted on said shaft in line with said impellers and in position to rub the tomatoes against the cylinder, whereby the tomatoes will be rapidly fed through the cylinder so as to discharge the skins at the end thereof, and a receptacle under the cylinder for receiving the chili sauce material.

5. A chili sauce machine including a substantially horizontal cylinder with an inlet end for the tomatoes and an outlet end for the skins and the intermediate portion thereof adjacent the inner end being provided with relatively large perforations substantially as and for the purpose set forth and with the portion near the discharge end not perforated, a hopper for feeding tomatoes at the inner end having a throat discharging at one side of the center line of the cylinder, a longitudinal shaft centrally located in said cylinder, impellers mounted on said shaft so that they will engage the tomatoes in said inlet throat at the downward movement thereof and being transversely curved to facilitate the feeding movement of said tomatoes, paddles in the cylinder adapted to rub the tomatoes against the perforated wall thereof and being inclined with reference to the axis of the shaft to facilitate the feeding movement of the tomatoes and extending into the discharge end of the cylinder in order to cause the discharge of the skins, and a receptacle under the cylinder for receiving the chili sauce material.

6. A chili sauce machine including a frame, a horizontal shaft mounted therein, a cylinder stationary on the frame concentrically surrounding said shaft and having its ends closed with a tomato inlet opening through one end located at one side on a vertical plane through said shaft and an outlet for the skins and cores in the other end and an intermediate portion of said cylinder being provided with relatively large perforations in the wall thereof adjacent the inlet end, a hopper adjacent the inlet end with a bottom inclined towards said inlet opening, a receptacle beneath the intermediate portion of said cylinder for receiving the chili sauce material that comes through the perforations thereof, an impeller mounted on said shaft in the inlet end of the cylinder which are curved transversely for rapidly moving the tomatoes from the hopper into the cylinder, and paddles mounted on said shaft in the intermediate portion of the cylinder which at one end are in alignment with the inner edge of said impellers and which are inclined therefrom to the other end of the paddles away from a plane cutting the shaft longitudinally so as to give a lead to said paddles and the outer edges of said paddles being spaced relatively far from the perforated wall of the cylinder, whereby the material will be rapidly moved through the machine so that the skins will not go through the perforations in the cylinder but will be discharged at the outlet in the end of the cylinder.

In witness whereof, I have hereunto affixed my signature.

JAMES F. LINDLEY.